US008766970B2

(12) United States Patent
Chien et al.

(10) Patent No.: US 8,766,970 B2
(45) Date of Patent: Jul. 1, 2014

(54) PIXEL CIRCUIT, DISPLAY PANEL, AND DRIVING METHOD THEREOF

(75) Inventors: Chih-Yuan Chien, Hsinchu (TW); Chien-Hua Chen, Hsinchu (TW); Chen-Kuo Yang, Hsinchu (TW); Hsueh-Ying Huang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1650 days.

(21) Appl. No.: 12/257,397

(22) Filed: Oct. 24, 2008

(65) Prior Publication Data

US 2009/0273592 A1 Nov. 5, 2009

(30) Foreign Application Priority Data

May 5, 2008 (TW) ............................... 97116533 A

(51) Int. Cl.
*G06F 3/038* (2013.01)
*G09G 5/00* (2006.01)

(52) U.S. Cl.
USPC ............................ 345/213; 345/100; 345/211

(58) Field of Classification Search
USPC .................................... 345/87–100, 211–213
See application file for complete search history.

(56) References Cited

U.S. PATENT DOCUMENTS

| | | | | |
|---|---|---|---|---|
| 6,958,791 | B2 | 10/2005 | Shimoshikiryo | |
| 7,079,214 | B2 | 7/2006 | Shimoshikiryo | |
| 2003/0227429 | A1 | 12/2003 | Shimoshikiryo | |
| 2005/0213015 | A1 | 9/2005 | Shimoshikiryo | |
| 2006/0290827 | A1 | 12/2006 | Kihara et al. | |
| 2007/0164957 | A1* | 7/2007 | Hsieh et al. | 345/90 |
| 2008/0012807 | A1 | 1/2008 | Chiang et al. | |
| 2008/0198116 | A1* | 8/2008 | Kim | 345/89 |
| 2009/0027324 | A1* | 1/2009 | Hsu et al. | 345/92 |
| 2009/0051641 | A1* | 2/2009 | Irie et al. | 345/96 |
| 2009/0128467 | A1* | 5/2009 | Chen | 345/87 |
| 2009/0135170 | A1* | 5/2009 | Hashimoto | 345/211 |

FOREIGN PATENT DOCUMENTS

| | | |
|---|---|---|
| CN | 1482593 A | 3/2004 |
| CN | 1908791 | 2/2007 |
| TW | 200727143 | 7/2007 |
| TW | 200805228 | 1/2008 |

OTHER PUBLICATIONS

"Office Action of Taiwan Counterpart Application", issued on Feb. 17, 2012, p. 1-p. 11, in which the listed references were cited.
"1st Office Action of China Counterpart Application, issued on Aug. 21, 2009", p. 1-p. 8.

* cited by examiner

*Primary Examiner* — Kimnhung Nguyen
(74) *Attorney, Agent, or Firm* — Jiang Chyun IP Office

(57) ABSTRACT

A pixel circuit includes a first sub-pixel and a second sub-pixel. The first sub-pixel is coupled to a scan line and a data line, so as to determine whether to be enabled according to a first scan signal transmitted on the scan line, and whether to be driven according to a data signal transmitted on the data line. The second sub-pixel is coupled to the scan line, so as to determine whether to be enabled according to the first scan signal. The data signal is in a first state when the first scan signal is in a pre-charged period. The data signal is in a second state during a time interval after the pre-charged period is over and before the first scan signal enters a turn-on period. Voltage polarities of the first state and the second state are opposite. The pixel design can improve color shift and frame flicker.

11 Claims, 10 Drawing Sheets

PIXEL CIRCUIT, DISPLAY PANEL, AND DRIVING METHOD THEREOF

CROSS-REFERENCE TO RELATED APPLICATION

This application claims the priority benefit of Taiwan application serial no. 97116533, filed on May 5, 2008. The entirety of the above-mentioned patent application is hereby incorporated by reference herein and made a part of specification.

BACKGROUND OF THE INVENTION

1. Field of the Invention

The present invention generally relates to a pixel circuit, a display panel, and a driving method thereof, and in particular, to a pixel circuit, a display panel, and a driving method thereof capable of improving color shift and frame flicker.

2. Description of Related Art

Liquid crystal displays (LCDs), having advantages of good space utilization, low power consumption, and no radiation etc., have gradually become mainstream products in the market. However, the market tends to develop LCDs having wide viewing angle, high resolution, and large scale.

Among them, the technical requirement of the wide viewing angle is originated from the circumstance that when the LCD is viewed at a large viewing angle, a severe color shift of the image occurs, and thus the color is distorted. Therefore, under the trend of more vivid frames, the technique of the wide viewing angle is absolutely necessary. The so-called color shift is that when viewing the LCD at a large viewing angle, the frame becomes whiter, that is, the larger viewing angle at the LCD which is viewed results in more serious problem of higher brightness of middle and low grayscale. So, if the higher brightness may be reduced, the circumstance of color shift may be effectively solved. In the conventional design, the scan lines or data lines are increased twice so as to achieve the better effect, but the cost of gate driver ICs and data driver ICs may be added.

In order to solve the circumstance of color shift, in the conventional art, a multi switch (MS) pixel structure is proposed. In brief, each pixel unit is divided into two display regions in the MS pixel structure, so as to effectively solve the circumstance of color shift. However, although the conventional MS pixel structure may effectively solve the circumstance of color shift, the frame flicker may be caused.

SUMMARY OF THE INVENTION

Accordingly, the present invention is directed to a display panel, a pixel circuit, and a driving method thereof, capable of effectively improving the frame flicker problem.

The present invention provides a pixel circuit having a scan line, a data line, and at least a first pixel and a second pixel wherein the first pixel and the second pixel respectively include a first sub-pixel and a second sub-pixel. The first sub-pixel may be coupled to the scan line and the data line, so as to determine whether to be enabled according to a first scan signal transmitted on the scan line, and to determine whether to be driven according to a data signal transmitted on the data line. In addition, the second sub-pixel may be coupled to the scan line, so as to determine whether to be enabled according to the first scan signal. When the first scan signal is in a pre-charged period, the data signal is in a first state. During a time interval after a pre-charged period is over and before the first scan signal enters a turn-on period, the data signal is in a second state. Voltage polarities of the first state and the second state are opposite. From another point of view, the present invention provides a display panel, which at least has a data line, and at least has a first pixel and a second pixel. The display panel is characterized in that both the first pixel and second pixel are coupled to the data line and respectively have a first sub-pixel and a second sub-pixel wherein the second sub-pixel of the first pixel is coupled to the first sub-pixel of the second pixel. In addition, the present invention further provides a display panel, which includes a plurality of scan lines, a plurality of data lines, and a pixel array. The scan lines may be arranged in parallel in a first direction, for transmitting a plurality of scan signals. Comparatively, the data lines may be arranged in parallel in a second direction, for transmitting a plurality of data signals. In addition, the data lines and the scan lines respectively enclose a plurality of pixel regions. The pixel array has a plurality of pixels, which are arranged in an array and are correspondingly disposed in the pixel regions respectively, and each pixel has a first sub-pixel and a second sub-pixel. The first sub-pixels and the second sub-pixels of the pixels in an $M^{th}$ row along the first direction may all be coupled to an $M^{th}$ scan line of the scan lines. In addition, at least a part of the first sub-pixels and the second sub-pixels of the pixels in an $N^{th}$ column along the second direction may receive the data signal transmitted on an $N^{th}$ data line of the data lines, in which M and N are positive integers, such that the polarities of the first sub-pixels and the second sub-pixels are opposite.

In an embodiment of the present invention, the pixels of the $N^{th}$ column along the second direction are driven according to a data signal transmitted on the $N^{th}$ data line.

In an embodiment of the present invention, when the scan signal transmitted on the $M^{th}$ scan line are in a pre-charged period, at least a part of the data signals are in a first state. During the time interval after the pre-charged period is over and before the scan signal transmitted on the $M^{th}$ scan line enters a turn-on period, the data signal in the first state in the pre-charged period is switched to a second state. Voltage polarities of the first state and the second state are opposite.

In another embodiment of the present invention, the first sub-pixels and the second sub-pixels of the pixels in the $N^{th}$ column along the second direction respectively receive the data signals transmitted on an $(N-1)^{th}$ and the $N^{th}$ data line.

Particularly, the voltage polarities of the data signals transmitted on neighbouring data lines are opposite, and each time the display panel switches frames, each data signal switches its voltage polarity.

In addition, the first sub-pixel may include a first transistor, a first liquid crystal capacitor, and a first storage capacitor. A source of the first transistor is coupled to one of the $N^{th}$ and the $(N-1)^{th}$ data line, and a gate of the first transistor is coupled to the scan line. In addition, the first liquid crystal capacitor may be used to ground a drain of the first transistor, and the first storage capacitor may be used to couple the drain of the first transistor to a common voltage line, so as to receive a common voltage. Comparatively, the second sub-pixel includes a second transistor, a second liquid crystal capacitor, and a second storage capacitor. A gate of the second transistor is coupled to the scan line, and a source of the second transistor is coupled to the first sub-pixels of the pixels in an $M+1^{th}$ row along the first direction. The second liquid crystal capacitor is used to ground a drain of the second transistor. The second storage capacitor is used to couple the drain of the second transistor to a common voltage line, so as to receive a common voltage.

In an embodiment of the present invention, the display panel of the present invention further includes a first redundant pixel group and a second redundant pixel group. The first redundant pixel group has a plurality of first redundant pixels which are correspondingly coupled to the pixels in the first row along the first direction respectively. Similarly, the second redundant pixel group has a plurality of second redundant pixels which are correspondingly coupled to the pixels in the last row along the first direction respectively.

In an embodiment of the present invention, the first direction and the second direction of the display panel of the present invention are perpendicular to each other.

From another point of view, the present invention provides a driving method of a display panel, adapted to drive a plurality of pixels in the display panel. The pixels are arranged in an array, and each pixel has a first sub-pixel and a second sub-pixel. The driving method is characterized by controlling polarities of driving voltages of the first sub-pixel and the second sub-pixel to be opposite.

The driving method of the present invention further includes generating a scan signal, so as to enable pixels in an $M^{th}$ row along a first direction, in which M is a positive integer. In addition, a data signal is generated, so as to drive pixels in an $N^{th}$ column along a second direction. When the scan signal is in a pre-charged period, the data signal is in a first state. During a time interval after the pre-charged period is over and before the scan signal enters a turn-on period, the data signal is in a second state. Voltage polarities of the first state and the second state are opposite, such that driving voltages of the first sub-pixel and the second sub-pixel of each pixel are opposite.

From another point of view, the driving method of the present invention further includes generating a scan signal, so as to enable the pixels in the $M^{th}$ row along the first direction, in which M is a positive integer. In addition, a first data signal is generated, so as to drive a part of the first sub-pixels and the second sub-pixels in the $N^{th}$ column along the second direction. A second data signal is generated, so as to drive remaining first sub-pixels and the second sub-pixels in the $N^{th}$ column along the second direction. The voltage polarities of the first data signal and the second data signal are opposite, such that the driving voltages of the first sub-pixel and the second sub-pixel of each pixel are opposite. Particularly, the polarities of the first data signal and the second data signal are switched in sync when frames are switched.

In the structure of the present invention, a complete pixel is divided into two sub-pixels (a first sub-pixel and a second sub-pixel), which is different from the conventional design to improve color shift by increasing gate driver ICs and data driver ICs, thereby saving the cost. Particularly, the driving method of the present invention achieves that the two sub-pixels have two voltages and opposite polarities, thereby further solving the fame flicker problem.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
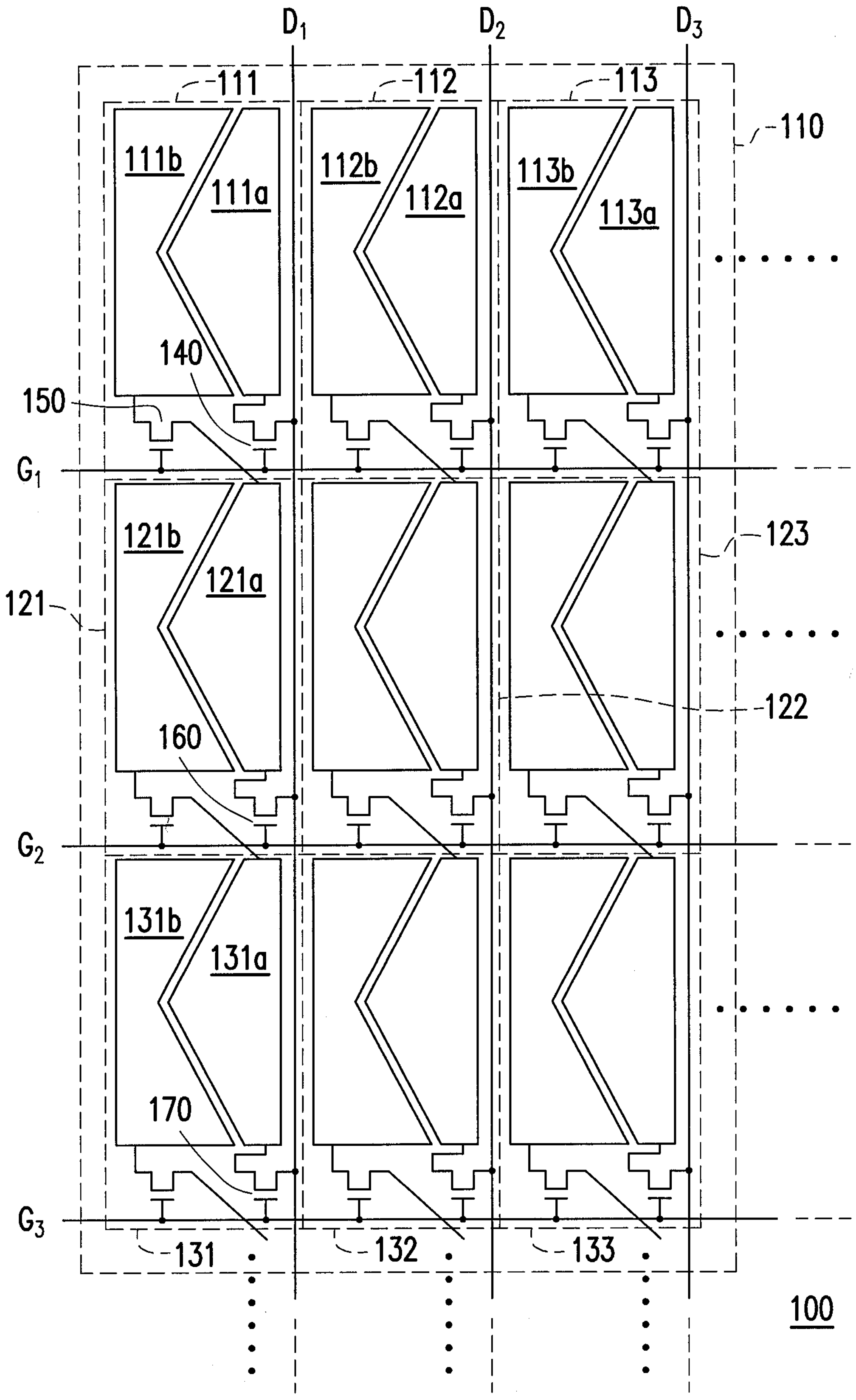
FIG. 1A is an architecture diagram of a display panel according to the first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The First Embodiment

FIG. 1A is an architecture diagram of a display panel according to the first embodiment of the present invention. Referring to FIG. 1A, the display panel 100 of this embodiment has a plurality of data lines, for example, $D_1$, $D_2$, and $D_3$, and a plurality of scan lines, for example, $G_1$, $G_2$, and $G_3$. The scan lines $G_1$, $G_2$, and $G_3$ . . . are arranged approximately in parallel in a first direction, and the data lines $D_1$, $D_2$, and $D_3$ . . . are arranged approximately in parallel in a second direction. In addition, the scan lines $G_1$, $G_2$, and $G_3$ . . . and the data line $D_1$, $D_2$, and $D_3$ . . . are not intersected.

The scans line $G_1$, $G_2$, and $G_3$ . . . and the data lines $D_1$, $D_2$, and $D_3$ . . . may enclose a plurality of display regions on the display panel 100, and the display regions are arranged in an array. One pixel is disposed in each display region, thereby forming a pixel array on the display panel 100. Particularly, each pixel is at least divided into a first sub-pixel and a second sub-pixel. In this embodiment, the first sub-pixels and the second sub-pixels of the pixels in an $M^{th}$ row along the first direction are all coupled to an $M^{th}$ scan line of the scan lines. In addition, the first sub-pixels and the second sub-pixels of the pixels in an $N^{th}$ column along the second direction receive the data signal transmitted on an $N^{th}$ data line of the data lines, in which M and N are positive integers.

For example, the pixels respectively enclosed by the scan lines $G_1$~$G_3$ and the data lines $D_1$~$D_3$ are 111~113, 121~123, and 131~133. The first sub-pixels 111*a*, 112*a*, and 113*a* and the second sub-pixels 111*b*, 112*b*, and 113*b* of the pixels 111, 112, and 113 are all coupled to the scan line $G_1$, and determined whether to be enabled according to a first scan signal transmitted on the scan line $G_1$. Comparatively, the first sub-pixels 111*a*, 121*a*, and 131*a* and the second sub-pixels 111*b*, 121*b*, and 131*b* of the pixels 111, 121, and 131 receive the data signal transmitted on the data line. Particularly, the first sub-pixels 111*a*, 121*a*, and 131*a* are all coupled to the data line $D_1$, so the first sub-pixels 111*a*, 121*a*, and 131*a* after being enabled by the first scan signal may be driven according to the data signal transmitted on the data line $D_1$. The second sub-pixels 111*b* and 121*b* are coupled to the data line $D_1$ through the switch transistors 160 and 170. The switch determines whether or not to turn on according to the second scan signal.

Figure 1B:
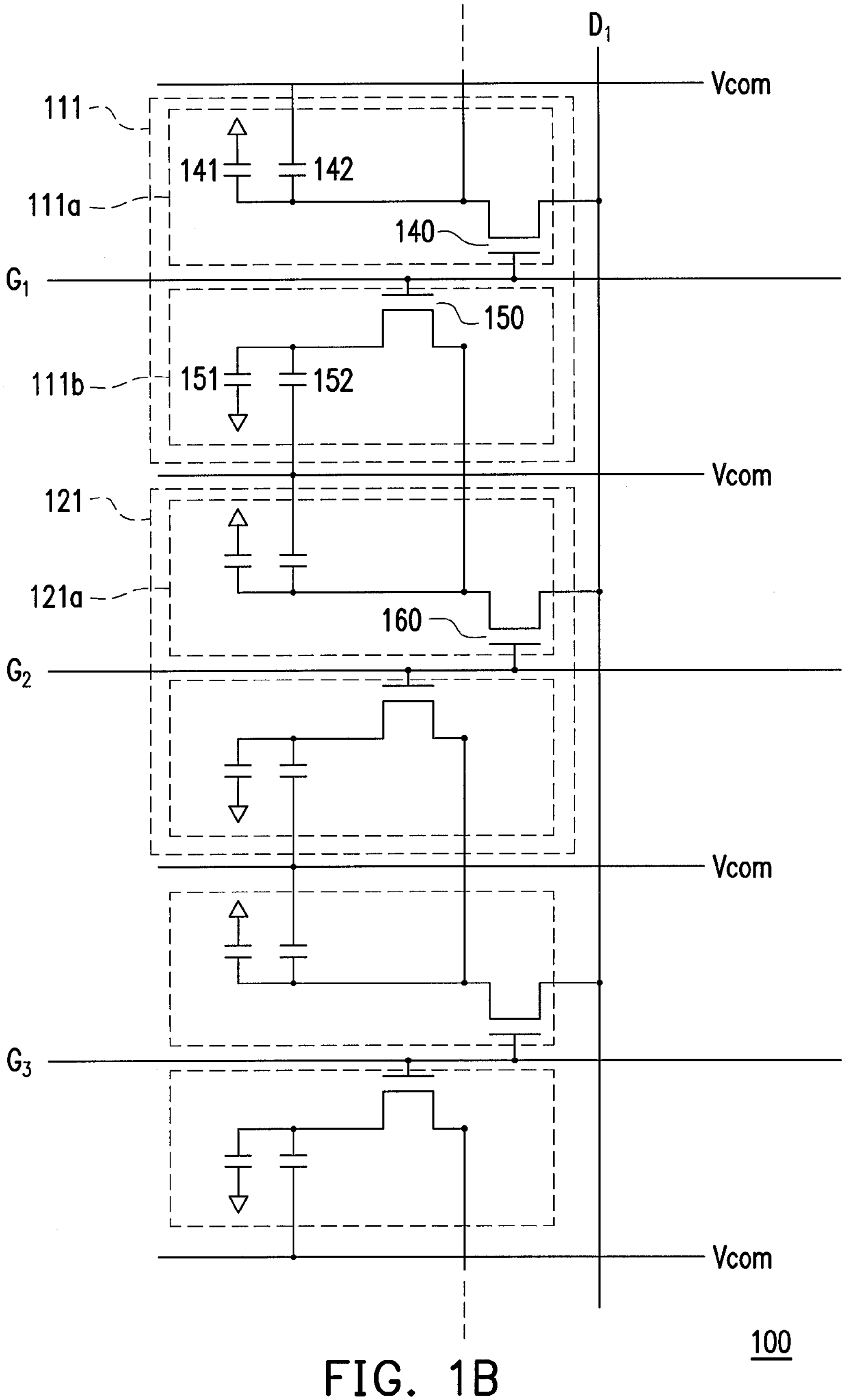
FIG. 1B is a circuit diagram of a pixel unit according to the first embodiment of the present invention.

FIG. 1B is a circuit diagram of a pixel unit according to the first embodiment of the present invention. Referring to FIG. 1B, in the following description, the first sub-pixel 111*a* and the second sub-pixel 111*b* are exemplified for illustration. Those of ordinary skill in the art may deduce the structures of other sub-pixels from the following description, so the details will not be described in the present invention. In this embodiment, the first sub-pixel 111*a* includes a first transistor 140, a first liquid crystal capacitor 141, and a first storage capacitor 142. Comparatively, the second sub-pixel 111*b* includes a second transistor 150, a second liquid crystal capacitor 151, and a second storage capacitor 152.

Accordingly, the gate of the first transistor 140 in the first sub-pixel 111*a* is coupled to the scan line $G_1$ and receives the scan signal transmitted on the scan line $G_1$, and the source of the first transistor 140 is coupled to the data line $D_1$ and receives the data signal transmitted on the data line $D_1$. In addition, the first liquid crystal capacitor 141 grounds the drain of the first transistor 140, and the first storage capacitor 142 couples the drain of the first transistor 140 to a common voltage line and receives a common voltage Vcom.

In addition, the gate of the second transistor 150 in the second sub-pixel 111*b* is coupled to the scan line $G_1$ and receives the scan signal transmitted on the scan line $G_1$, and the source of the second transistor 150 is coupled to the data line $D_1$ through the switch transistor 160. It may be clearly seen from FIGS. 1A and 1B that the switch transistor 160 is the first transistor 160 in the first sub-pixel 121*a* of a next-level pixel 121. The source of the switch transistor 160 is coupled to the data line $D_1$, the gate of the switch transistor 160 is coupled to the scan line $G_2$, and the drain of the switch transistor 160 is coupled to the source of the second transistor 150. The switch transistor 160 may determine whether or not to turn on according to a second scan signal, such that the second transistor 150 may receive the data signal transmitted on the data line $D_1$ through the turn-on of the switch transistor 160. In addition, the second liquid crystal capacitor 151 grounds the drain of the second transistor 150, and the second storage capacitor 152 couples the drain of the second transistor 150 to a common voltage line and receives a common voltage Vcom.

Figure 2:
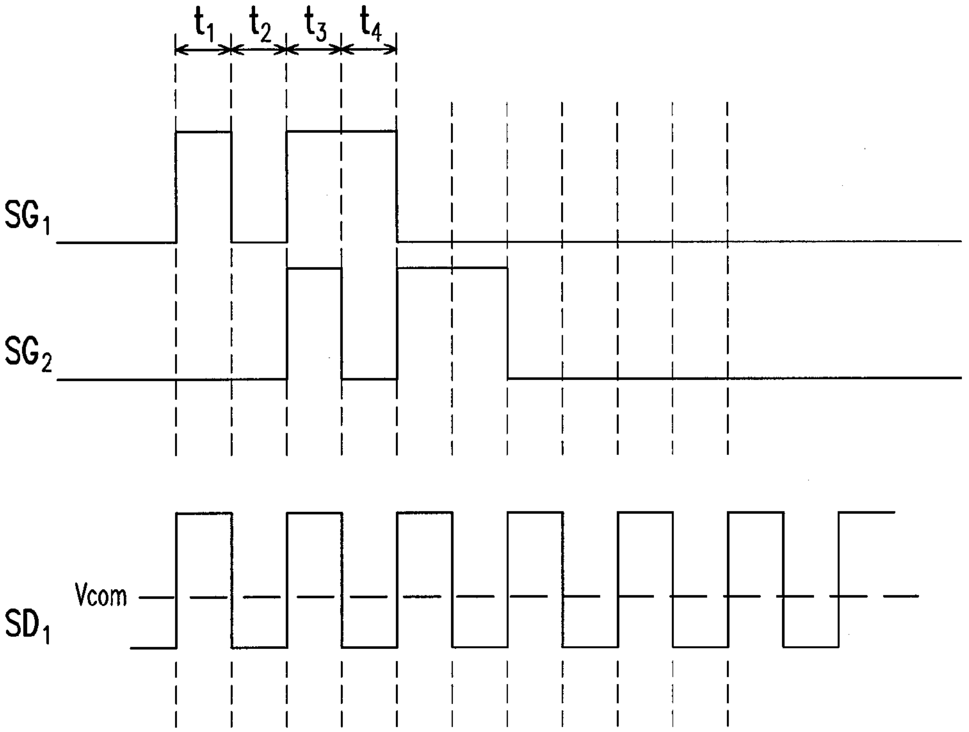
FIG. 2 is a waveform diagram of the display panel according to the first embodiment of the present invention.

FIG. 2 is a waveform diagram of the display panel according to the first embodiment of the present invention. Referring to FIGS. 1A, 1B, and 2 together, the scan signals $SG_1$~$SG_3$ are, for example, the scan signal waveforms transmitted on the scan lines $G_1$~$G_3$, and the data signal $SD_1$ may be the waveform of the data signal transmitted on the data line $D_1$. During $t_1$ which may be referred to as the pre-charged period of the scan signal $SG_1$, the scan signal $SG_1$ may be enabled. At this time, the data signal $SD_1$ is in the first state. In this embodiment, the first state is a positive polarity state. The scan signal $SG_1$ is in a high state, so both the first transistor 140 and the second transistor 150 are turned on, and the data signal $SD_1$ may be transferred to the first liquid crystal capacitor 141 and the first storage capacitor 142 through the first transistor 140.

During $t_2$, the scan signal $SG_1$ may be dropped, and the scan signal $SG_2$ sustains its original state. In addition, the data signal $SD_1$ may transit to a second state. At this time, the first transistor 140 and the second transistor 150 may be turned off, and the state of the first storage capacitor 142 remains unchanged. In this embodiment, the voltage polarities of the first state and the second state are opposite.

During $t_3$, the scan signal $SG_1$ may be enabled again to enter a turn-on period. At the same time, the scan signal $SG_2$ may also be enabled to enter the pre-charged period. In addition, the data signal $SD_1$ restores the first state. At this time, the scan signals $SG_1$ and $SG_2$ are enabled, the second transistor 150 and the first transistors 140 and 160 may all be turned on, such that the data signal $SD_1$ in first state may be transferred to the first liquid crystal capacitor 141, the second liquid crystal capacitor 151, the first storage capacitor 142, and the second storage capacitor 152 through the second transistor 150, and the first transistors 140 and 160.

Next, during $t_4$, the pre-charged period of the scan signal $SG_2$ is over, and the scan signal $SG_2$ transits to a low potential, and the scan signal $SG_1$ remains at a high potential. In addition, the data signal $SD_1$ also transits from the first state to the second state. Here, the first transistor 160 transits to be turn-off, but the first transistor 140 and the second transistor 150 remain the turn-on state. Therefore, the data signal $SD_1$ in the second state may be transferred to the first liquid crystal capacitor 141 and the first storage capacitor 142 through the first transistor 140, such that the voltages of the first liquid crystal capacitor 141 and the first storage capacitor 142 are in the second state (the negative polarity state in this embodiment). In contrast, the first transistor (switch transistor) 160 is turned off, so the second liquid crystal capacitor 151 and the second storage capacitor 152 still remain in the first state (the positive polarity state in this embodiment), such that the polarities of the second sub-pixel 111*b* and the first sub-pixel 111*a* are opposite, thereby realizing the operation of dot inversion. Through the operation of dot inversion, the frame flicker of the LCD may be reduced.

Figure 3:
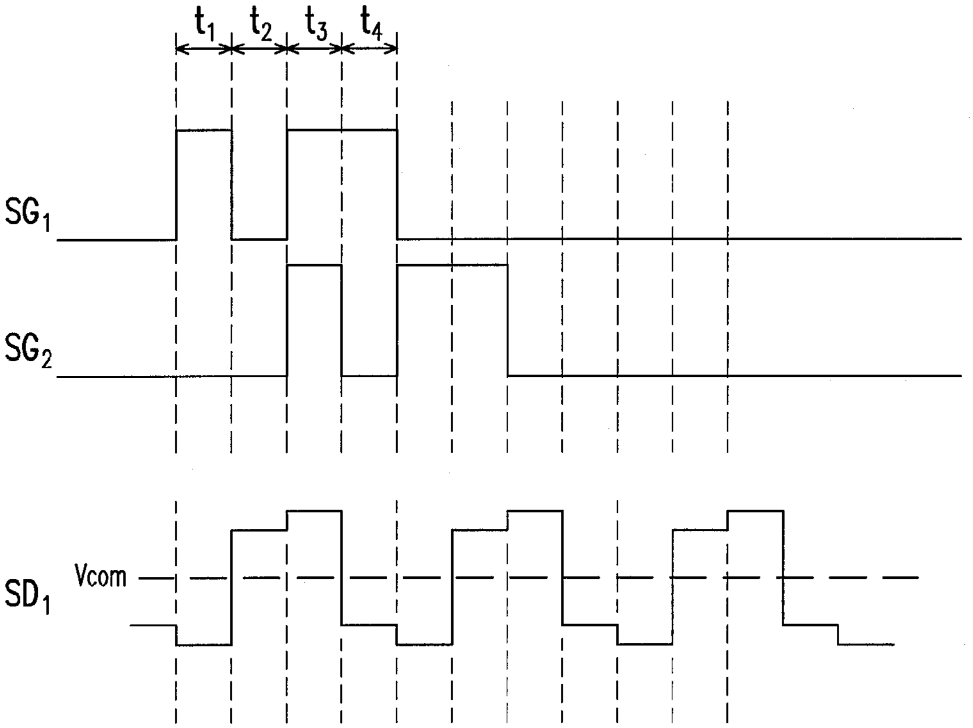
FIG. 3 is a waveform diagram of the display panel according to the first embodiment of the present invention.
Figure 4:
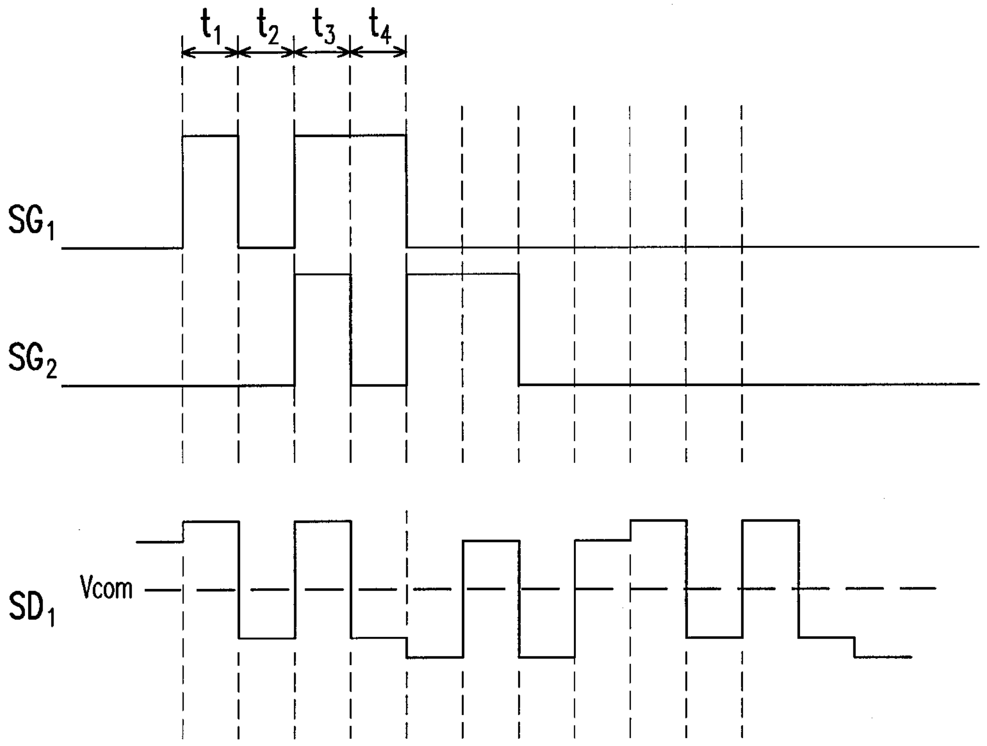
FIG. 4 is a waveform diagram of the display panel according to the first embodiment of the present invention.
Figure 5:
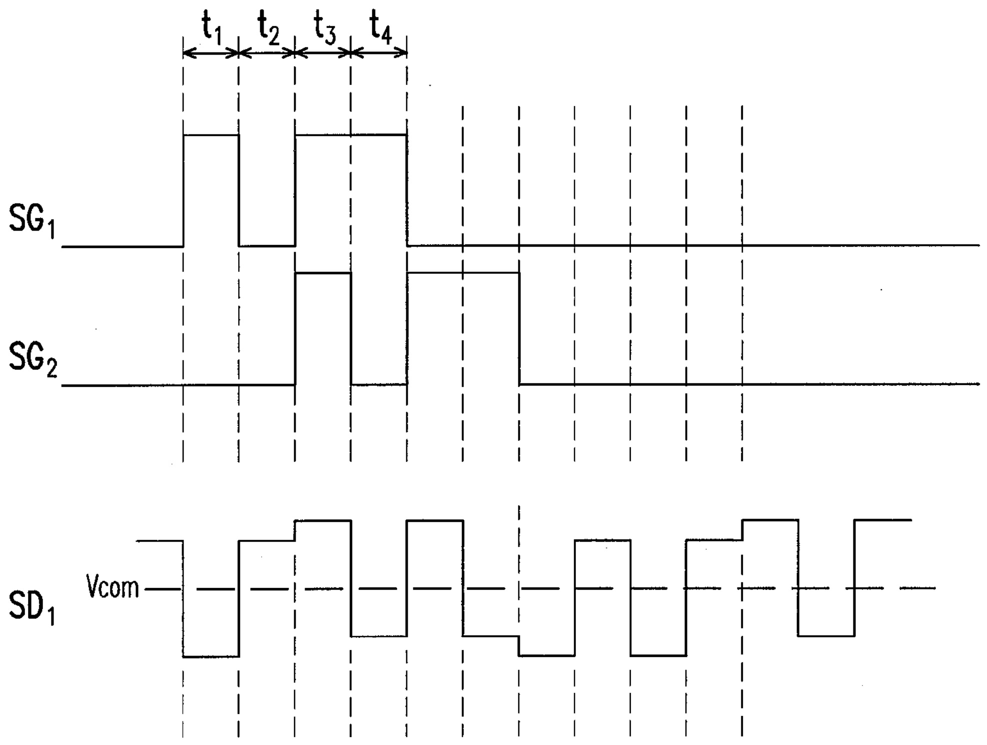
FIG. 5 is a waveform diagram of the display panel according to the first embodiment of the present invention.

Although only the waveforms and the illustrations of the scan signals $SG_1$ and $SG_2$ are provided in the above description, those of ordinary skill in the art may deduce the operating manner of other pixels with reference to the above description, and the details will not be described in the present invention. In addition, the waveform of the data signal in the present invention is not limited to the above description. For example, the waveform diagrams as shown in the FIGS. 3, 4, and 5 may also be applied in the present invention.

The Second Embodiment

Figure 6:
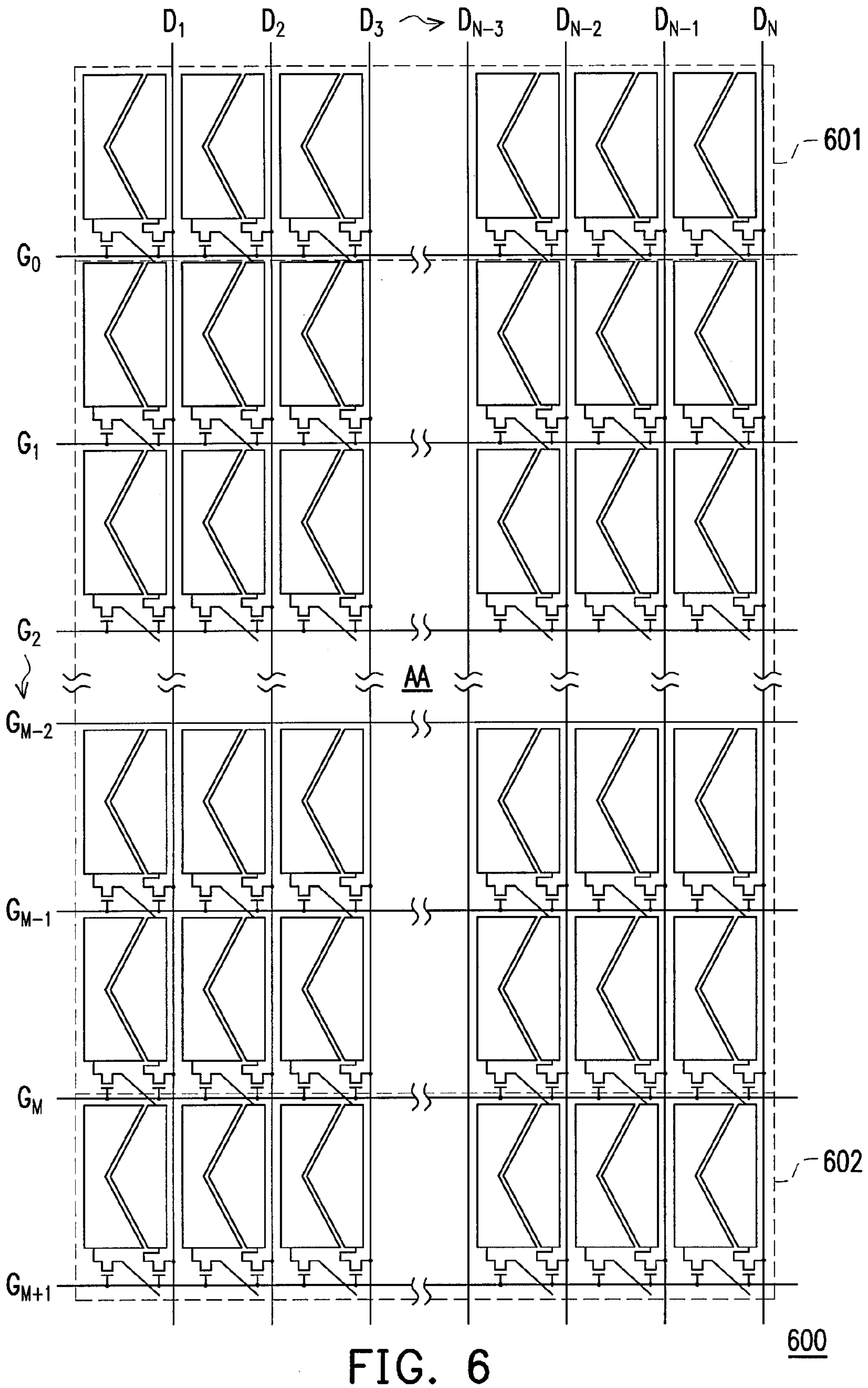
FIG. 6 is an architecture diagram of a display panel according to the second embodiment of the present invention.

FIG. 6 is an architecture diagram of a display panel according to the second embodiment of the present invention. Referring to FIG. 6, a display panel 600 of this embodiment further includes a first redundant pixel group 601 and a second redundant pixel group 602. The first redundant pixel group 601 may include a plurality of first redundant pixels, and each first redundant pixel may be correspondingly coupled to the pixels in the first row along the first direction respectively. Comparatively, the second redundant pixel group 602 may include a plurality of second redundant pixels, and each second redundant pixel may be correspondingly coupled to the pixels in the last row along the first direction respectively.

It may be known from the driving method of the first embodiment that the pixels in the last row along the first direction may not be displayed normally unless the second sub-pixels of the pixels in the last row along the first direction are driven by the first sub-pixels in the next row. Therefore, a row of pixels and a scan line $G_{M+1}$ below a display region AA of the display panel 600 must be added, so as to be correspondingly coupled to the pixels in the last row along the first direction respectively. In order to obtain a symmetrical panel design, a row of pixels and a scan line $G_0$ are added above the display region AA of the display panel 600, so as to be correspondingly coupled to the pixels in the first row along the first direction respectively, thereby obtaining the most complete architecture.

The Third Embodiment

Figure 7A:
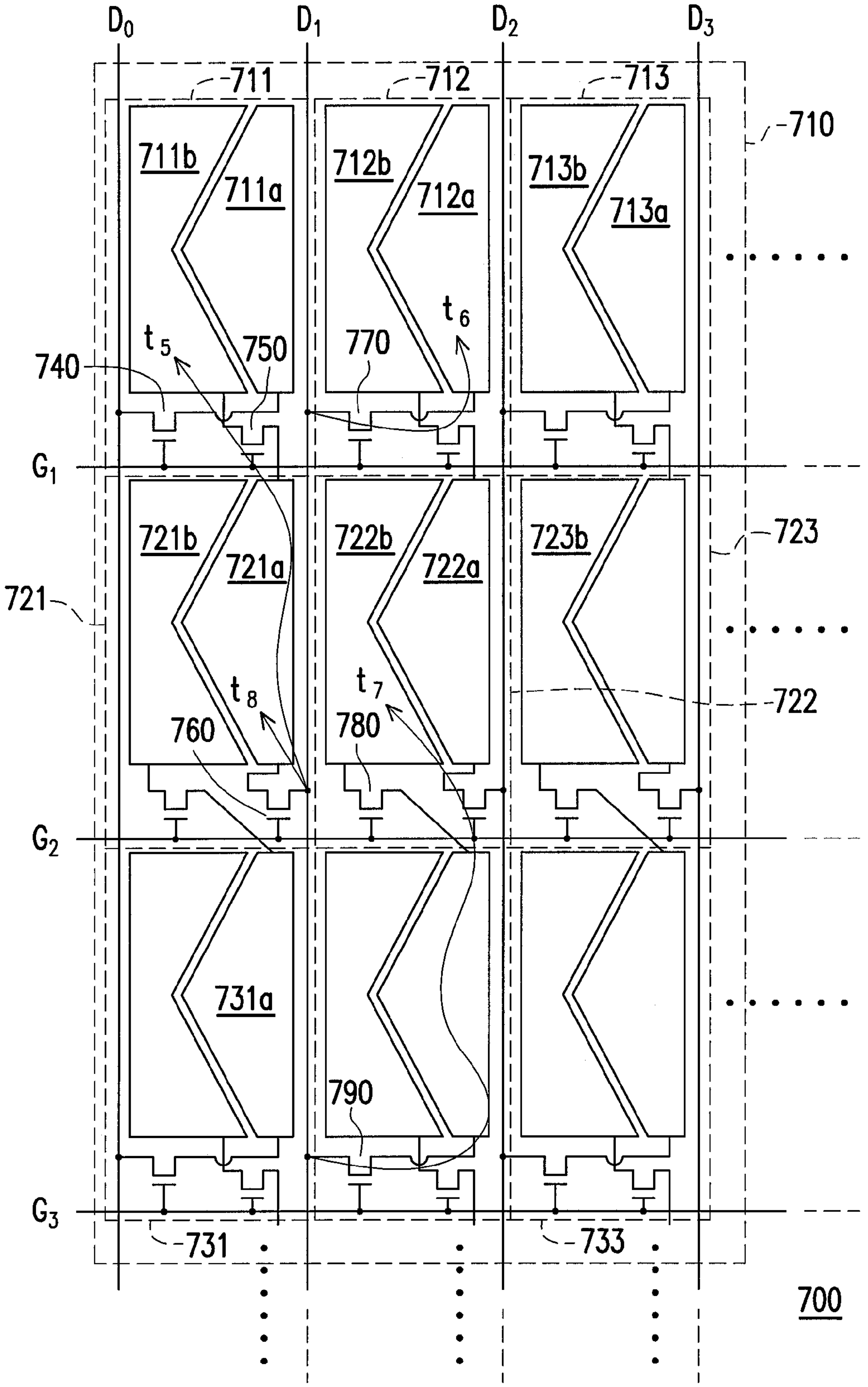
FIG. 7A is an architecture diagram of a display panel according to the third embodiment of the present invention.

The flicker problem has been effectively overcome in the first embodiment. However, in the first embodiment, the polarity of each data signal must be continually switched in the same image, which results in the difficulty in operation. Therefore, an architecture diagram of another display panel as shown in FIG. 7A is provided in the present invention. Referring to FIG. 7A, a display panel 700 of this embodiment is substantially the same as that of the first embodiment, except that in the display panel 700, the first sub-pixels of the pixels in the $N^{th}$ row along the second direction receive the data signals transmitted on the $(N-1)^{th}$ or the $N^{th}$ data line. In this embodiment, the first sub-pixels of the pixels in the odd rows receive the data signal transmitted on the $(N-1)^{th}$ data line, and the first sub-pixels of the pixels in the even rows receive the data signal transmitted on the $N^{th}$ data line. For example, the first sub-pixels 711_a_ and 731_a_ of the pixels 711 and 731 are coupled to the data line $D_0$, and are driven according to the data signal transmitted on the data line $D_0$. The first sub-pixel 721_a_ of the pixel 721 is coupled to the data line $D_1$, and is driven according to the data signal transmitted on the data line $D_1$.

In addition, the second sub-pixel of each pixel along the second direction is coupled to the first sub-pixel of next pixel. For example, the second sub-pixels 711_b_ and 721_b_ are coupled to the first sub-pixels 721_a_ and 731_a_ of the pixels 721 and 731.

Figure 7B:
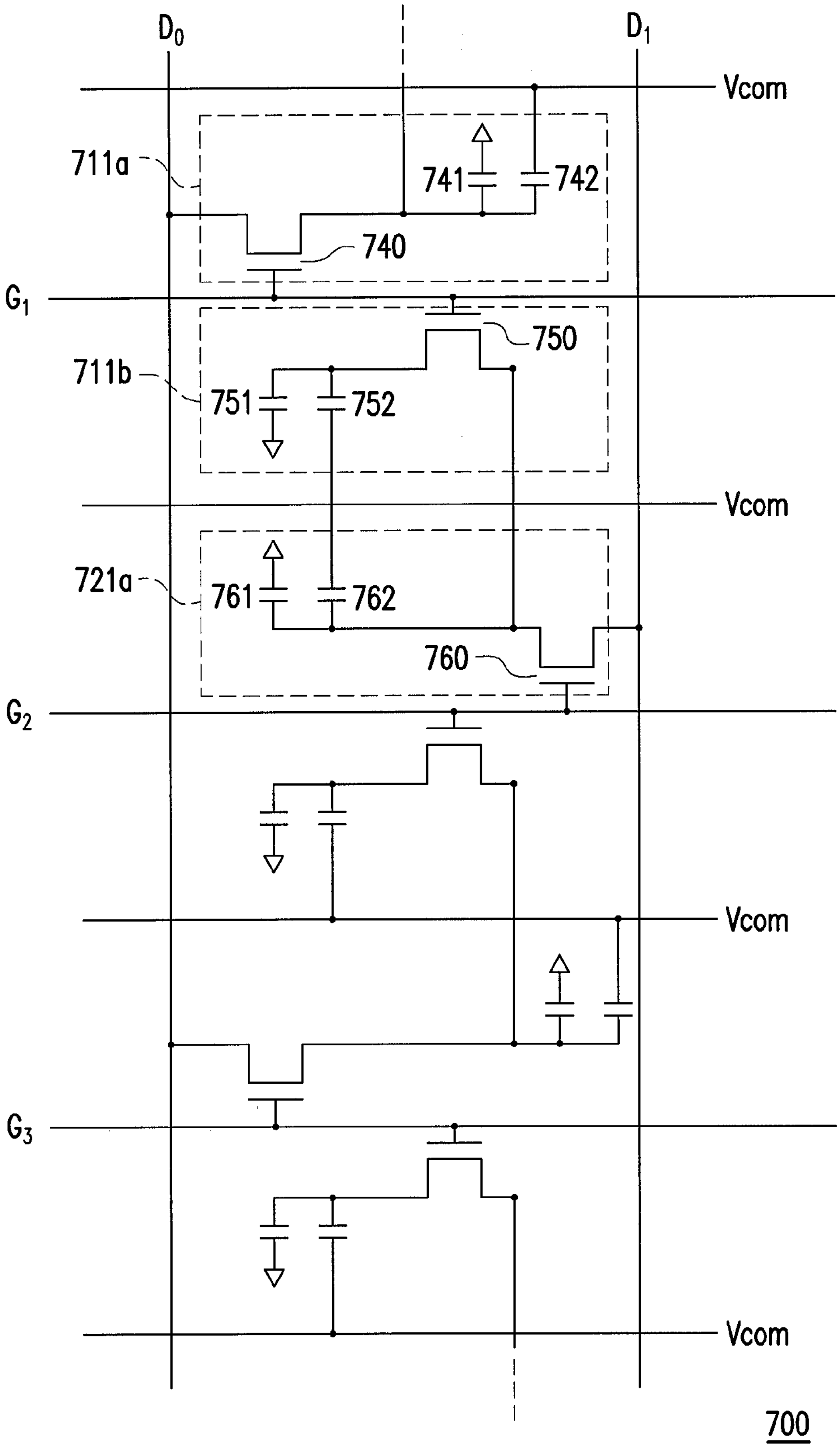
FIG. 7B is a circuit diagram of a pixel unit according to the third embodiment of the present invention.

FIG. 7B is a circuit diagram of a pixel unit according to the third embodiment of the present invention. Referring to FIG. 7B, in the following description, the first sub-pixel 711_a_ and the second sub-pixel 711_b_ are exemplified for illustration. Those of ordinary skill in the art may deduce the structures of other sub-pixels from the following description, so the details will not be described in the present invention. In this embodiment, the first sub-pixel 711_a_ includes a first transistor 740, a first liquid crystal capacitor 741, and a first storage capacitor 742. Comparatively, the second sub-pixel 711_b_ includes a second transistor 750, a second liquid crystal capacitor 751, and a second storage capacitor 752.

Accordingly, the gate of the first transistor 740 of the first sub-pixel 711_a_ is coupled to the scan line $G_1$ and receives the scan signal transmitted on the scan line $G_1$, and the source of the first transistor 740 of the first sub-pixel 711_a_ is coupled to the data line $D_0$ and receives the data signal transmitted on the data line $D_0$. In addition, the first liquid crystal capacitor 741 grounds the drain of the first transistor 740, and the first storage capacitor 742 couples the drain of the first transistor 740 to a common voltage line and receive the common voltage Vcom.

In addition, the gate of the second transistor 750 of the second sub-pixel 711_b_ is coupled to the scan line $G_1$ and receives the scan signal transmitted on the scan line $G_1$, and the source of the second transistor 750 of the second sub-pixel 711_b_ is coupled to the data line $D_1$ through switch transistor 760. It may be clearly seen from FIGS. 7A and 7B that the switch transistor 760 is the first transistor 760 of the first sub-pixel 721_a_ of the next-level pixel 721. The source of the switch transistor 760 is coupled to the data line $D_1$, the gate of the switch transistor 760 is coupled to the scan line $G_2$, and the drain of the switch transistor 760 is coupled to the source of the second transistor 750, such that the second transistor 750 may receive the data signal transmitted on the data line $D_1$ through the switch transistor 760. In addition, the second liquid crystal capacitor 751 grounds the drain of the second transistor 750, and the second storage capacitor 752 couples the drain of the second transistor 750 to a common voltage line and receives the common voltage Vcom.

Figure 8:
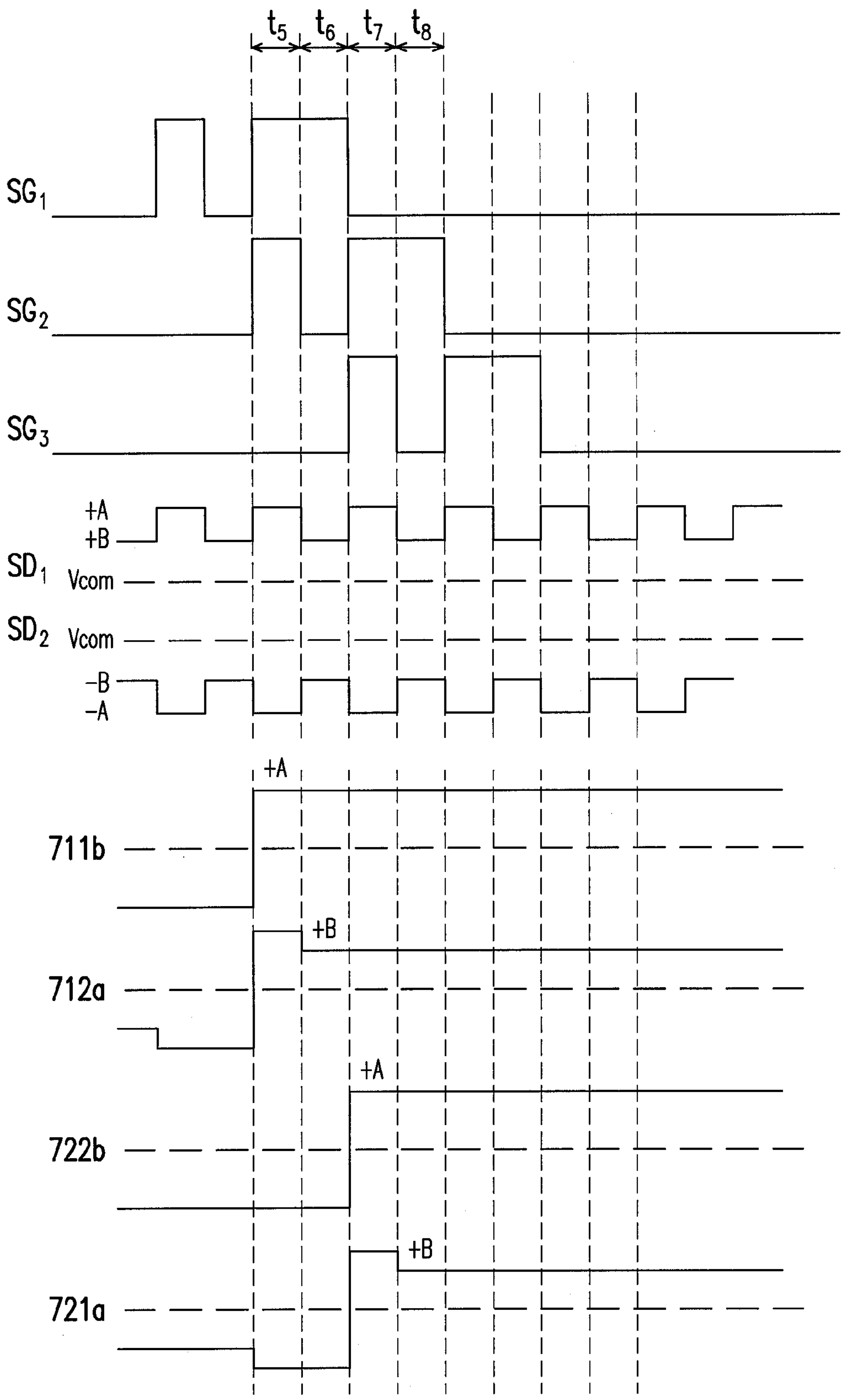
FIG. 8 is a waveform diagram of the display panel according to the third embodiment of the present invention.

FIG. 8 is a waveform diagram of the display panel according to the third embodiment of the present invention. Referring to FIGS. 7A, 7B, and 8 together, the scan signals $SG_1 \sim SG_3$ may be, for example, the waveforms of the scan signals transmitted on the scan lines $G_1 \sim G_3$, and the data signals $SD_1$ and $SD_2$ may be the waveform of the data signal transmitted on the data lines $D_1$ and $D_2$. During $t_5$, the scan signal $SG_1$ may be enabled, and the scan signal $SG_2$ may also be enabled at the same time. In addition, the data signal $SD_1$ is the first data signal (positive polarity state in this embodiment, and the voltage level is +A during the $t_5$). At this time, the second transistor 750 and the first transistors 760 and 770 may be turned on. Thus, the first data signal $SD_1$ may be transferred to the second liquid crystal capacitor 751, the second storage capacitor 752, and the first liquid crystal capacitor (not shown) and the first storage capacitor (not shown) of the first sub-pixel 712_a_ through the second transistor 750 and the first transistors 760 and 770. It may be deduced from the above that when the data signal $SD_2$ is the second data signal (in this embodiment, the voltage polarities of the first data signal and the second data signal are opposite, so the voltage level may be −A here), such that the second data signal $SD_2$ may be transferred to the second liquid crystal capacitor (not shown) and the second storage capacitor (not shown) of the second sub-pixel 712_b_ and the first liquid crystal capacitor (not shown) and the first storage capacitor (not shown) of the first sub-pixel 713_a_.

During $t_6$, the scan signal $SG_2$ transits to the low potential, and the scan signal $SG_1$ remains at the high potential. In addition, the data signal $SD_1$ is the first data signal (the positive polarity state in this embodiment, and the voltage level is +B during $t_6$). At this time, the first transistor 760 may transit to the turn-off, but the second transistor 750 and the first transistor 770 may sustain the turn-on state. Therefore, the first data signal SD1 may be transferred to the first liquid crystal capacitor (not shown) and the first storage capacitor (not shown) of the first sub-pixel 712_a_ through the first transistor 770. It may be deduced from the above that when the data signal $SD_2$ is the second data signal (the voltage level is −B in this embodiment), the second data signal $SD_2$ may be transferred to the first liquid crystal capacitor (not shown) and the first storage capacitor (not shown) of the first sub-pixel 713_a_. Therefore, at this time, the first sub-pixel 712_a_ of the pixel 712 has the positive polarity and the second sub-pixel 712_b_ has the negative polarity, i.e., the polarities of the first sub-pixel 712_a_ and the second sub-pixel 712_b_ are opposite.

During $t_7$, the scan signal $SG_2$ may be enabled, and at the same time, the scan signal $SG_3$ may also be enabled. In addition, the data signal $SD_1$ is the first data signal (the positive polarity state in this embodiment, and the voltage level is +A during $t_7$). At this time, the scan signals $SG_2$ and $SG_3$ are enabled, the first transistors 760 and 790 and the second transistor 780 may be turned on, such that the first data signal $SD_1$ may be transferred to a first liquid crystal capacitor 761 and a first storage capacitor 762 of a first sub-pixel 721_a_, and a second liquid crystal capacitor (not shown) and a second storage capacitor (not shown) of a second sub-pixel 722_b_ through the first transistors 760 and 790 and the second transistor 780. It may be deduced from the above that when the data signal $SD_2$ is the second data signal (in this embodiment, the voltage level is −A here), such that the second data signal $SD_2$ may be transferred to a first liquid crystal capacitor (not shown) and a first storage capacitor (not shown) of a first sub-pixel 722*a* and a second liquid crystal capacitor (not shown) and a second storage capacitor (not shown) of a second sub-pixel 723*b*.

Next, during $t_8$, the scan signal $SG_3$ transits to the low potential, and the scan signal $SG_2$ remains at the high potential. In addition, the data signal $SD_1$ is the first data signal (the positive polarity state in this embodiment, and the voltage level is +B during $t_8$). At this time, the first transistor 790 may transit to the turn-off, but the first transistor 760 and the second transistor 780 sustain the turn-on state. Therefore, the first data signal $SD_1$ may be transferred to the first liquid crystal capacitor 761 and the first storage capacitor 762 through the first transistor 760. It may be deduced from the above that when the data signal $SD_2$ is the second data signal (the voltage level is −B in this embodiment), the second data signal $SD_2$ may be transferred to the first liquid crystal capacitor (not shown) and the first storage capacitor (not shown) of the first sub-pixel 722*a*. Therefore, the first sub-pixel 722*a* of the pixel 722 has the negative polarity, and the second sub-pixel 722*b* of the pixel 722 has the positive polarity, i.e., the polarities of the first sub-pixel 722*a* and the second sub-pixel 722*b* are opposite.

Further, when switching frames, the display panel 700 switches the polarities of the first data signal and the second data signal in sync. In the above operating manner, the polarities of the first sub-pixel and the second sub-pixel of the same pixel are made to be opposite, so the display panel 700 exhibits the driving method like the dot inversion, thereby reducing the frame flicker of the LCD.

It may be known from the above that each data line can only drive one sub-pixel of a left pixel and a right pixel disposed beside the data line. In order to keep the completeness in driving, the above driving method includes disposing a data line $D_0$, such that the pixels in the first column along the second direction may be displayed normally. In other words, a data line $D_{N+1}$ (not shown) may also be disposed in the pixel array 710, such that the pixels in the last column along the second direction may be displayed normally. It should be noted that the architecture diagram of the display panel 700 is only one of the examples of this embodiment, and the present invention is not limited to the above architecture.

Although the waveforms and the illustrations of the scan signals $SG_1$, $SG_2$, and $SG_3$ are provided, those of ordinary art in the field may deduce the operating manners of other pixels through the above illustrations, so the details will not be described in the present invention.

It may be known from the above that in this embodiment, the polarities of the data signals in the same data line are the same in the same frame. Therefore, in this embodiment, the dot inversion operation may be realized by using a simple driving method.

The Fourth Embodiment

Figure 9:
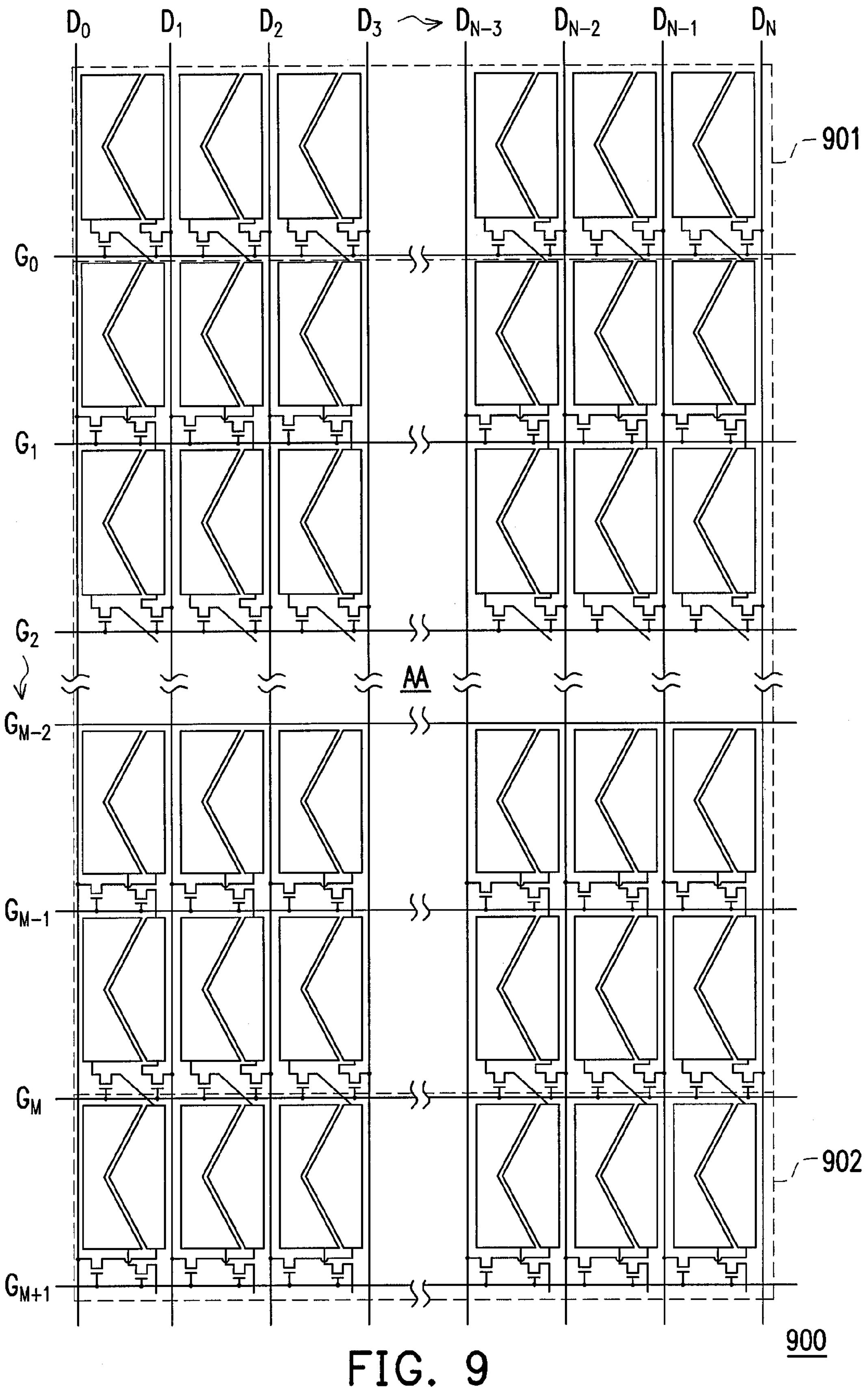
FIG. 9 is an architecture diagram of a display panel according to the fourth embodiment of the present invention.

FIG. 9 is an architecture diagram of a display panel according to the fourth embodiment of the present invention. Referring to FIG. 9, a display panel 900 of this embodiment further includes a first redundant pixel group 901 and a second redundant pixel group 902. The first redundant pixel group 901 may includes a plurality of first redundant pixels, and each first redundant pixel may be correspondingly coupled to the pixels in the first row along the first direction respectively. Comparatively, the second redundant pixel group 902 may include a plurality of second redundant pixels, and each second redundant pixel may be correspondingly coupled to the pixels in the last row along the first direction respectively.

It may be known from the driving method of the third embodiment that the pixels in the last row along the first direction may not be displayed normally unless the second sub-pixels of the pixels in the last row along the first direction are driven by the first sub-pixels in the next row. Therefore, a row of pixels and a scan line $G_{M+1}$ below a display region AA of the display panel 900 must be added, so as to be correspondingly coupled to the pixels in the last row along the first direction respectively. In order to obtain a symmetrical panel design, a row of pixels and a scan line $G_0$ are added above the display region AA of the display panel 900, so as to be correspondingly coupled to the pixels in the first row along the first direction respectively, thereby obtaining the most complete architecture.

It may be known from the above that through the characteristics of the scan signal, the two sub-pixels of one pixel may have difference voltages, which may effectively solve the color shift problem, and the voltage polarities of the data signals transmitted on neighbouring data lines are opposite, such that the driving voltages of the first sub-pixel and the second sub-pixel of each pixel are opposite, thereby reducing the frame flicker. In addition, the driving method of this embodiment is a column inversion. When switching frames, the display panel switches the voltage polarity of each data signal in sync, such that display panel exhibits the driving method like the dot inversion, thereby overcoming the disadvantage of the power consumption resulting from the dot inversion and having the advantage of the dot inversion that the frame flicker is reduced. In order to achieve the normal display of the panel and the symmetry of the panel design, a row of pixels and a scan line are added above and below the display region respectively, so as to achieve the completeness of the design.

Figure 10:
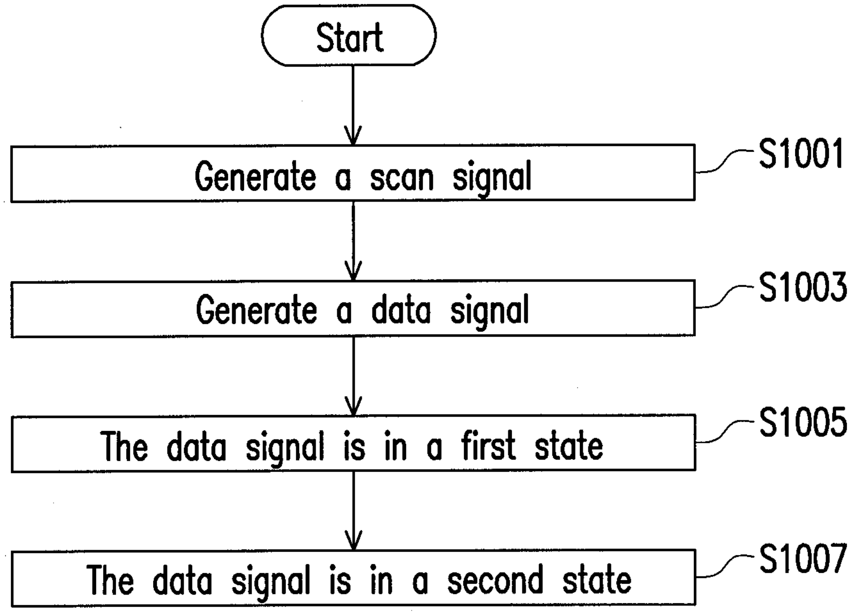
FIG. 10 is a flow chart of a driving method of a display panel according to an embodiment of the present invention.
Figure 11:
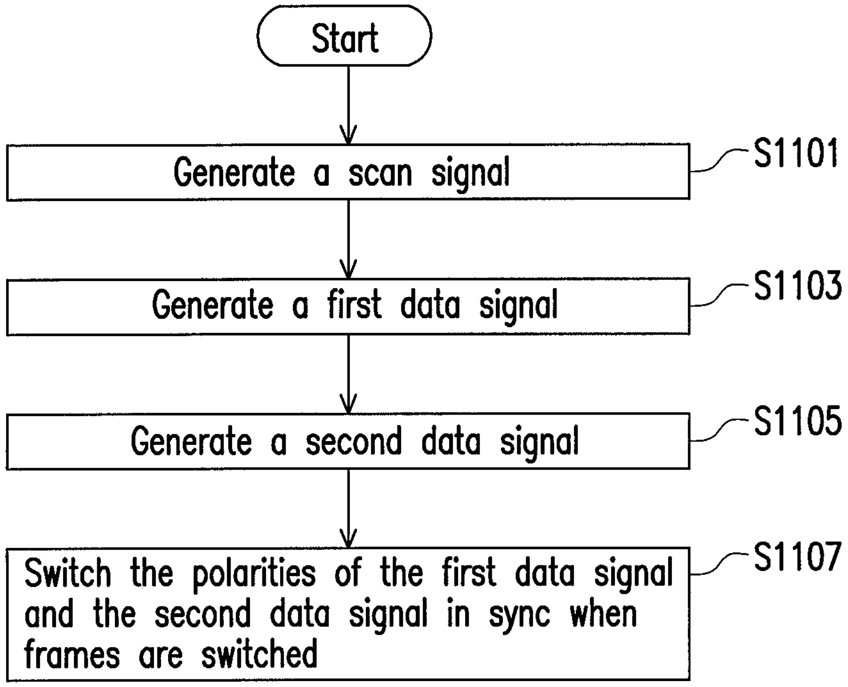
FIG. 11 is a flow chart of a driving method of a display panel according to another embodiment of the present invention.

Based on the organization of the above descriptions, the present invention further provides several driving methods of a display panel, as shown in FIGS. 10 and 11. The driving method of this embodiment is adapted to drive a plurality of pixels in the display panel. The pixels are arranged in an array, and each pixel includes a first sub-pixel and a second sub-pixel. It should be noted that one of the important features of the driving method is that the driving voltage polarities of the first sub-pixel and the second sub-pixel of each pixel are controlled to be opposite.

Referring to FIG. 10, first, in step S1001, a scan signal generated by the scan line may enable the pixels in the $M^{th}$ row along the first direction. Then, in step S1003, a data signal generated by the data line may drive the pixels enabled by the scan signals in the $N^{th}$ column along the second direction. Then, in step S1005, when the scan signal is in the pre-charged period, the data signal is in a first state. Finally, in step S1007, during the time interval after the pre-charged period is over and before the scan signal enters the turn-on period, the data signal is in a second state. The voltage polarities of the first state and the second state are opposite, such that driving voltages of the first sub-pixel and the second sub-pixel of each pixel are opposite. M and N are positive integers. Other details of the driving method may refer to the illustration of the above embodiments, and will not be described herein again.

Referring to FIG. 11, first, in step S1101, a scan signal generated by the scan line may enable the pixels in the $M^{th}$ row along the first direction. Then, in step S1103, a first data signal generated by the data line may drive a part of the first sub-pixels and the second sub-pixels of the pixels enabled by the scan signals in the $N^{th}$ column along the second direction. Then, in step S1105, a second data signal generated by the data line may drive the remaining first sub-pixels and the second sub-pixels of the pixels enabled by the scan signal in the $N^{th}$ column along the second direction. The voltage polarities of the first data signal and the second data signal are opposite, such that the driving voltages of the first sub-pixel and the second sub-pixel of each pixel are opposite. Finally, in step S1107, the polarities of the first data signal and the second data signal are switched in sync when switching frames. M and N are positive integers. Other details of the driving method may refer to the illustration of the above embodiments, and will not be described herein again.

To sum up, the present invention provides a pixel circuit, a display panel, and a driving method thereof. The present invention needs not increase gate driver ICs and data driver ICs to achieve that one pixel is divided into a first sub-pixel and a second sub-pixel, and the two sub-pixels of the pixel have two voltages. This pixel architecture is referred to as Multi Switch (MS). With this design, the sub-pixel region with larger voltage can maintain the brightness of the high grayscale, and the sub-pixel region with the smaller voltage value can make middle and low grayscales darker, thereby improving the color shift. However, the present invention is characterized in that the polarities of the sub-pixels are opposite through the polarities of the data signals of the data line, so as to reduce the frame flicker. MSHD in conjunction with column inversion can achieve the same driving effect of the dot inversion, and requires a lower power, thereby reducing the power consumption.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel, comprising:

a plurality of scan lines, arranged in parallel in a first direction, for transmitting a plurality of scan signals;

a plurality of data lines, arranged in parallel in a second direction, for transmitting a plurality of data signals, wherein each of the data lines and the scan lines respectively enclose a plurality of pixel regions; and a pixel array comprising a plurality of pixels arranged in an array and correspondingly disposed in the pixel regions respectively, wherein each pixel comprises a first sub-pixel and a second sub-pixel;

wherein the first sub-pixels and the second sub-pixels of the pixels in an Mth row along a first direction are all coupled to an Mth scan line of the scan lines, at least part of the first sub-pixels and the second sub-pixels of the pixels in an Nth column along a second direction receive the data signal transmitted on an Nth data line of the data lines, where M and N are positive integers, and polarities of each first sub-pixel and each second sub-pixel are opposite.

2. The display panel according to claim 1, wherein the pixels in the $N^{th}$ column along the second direction are driven according to the data signal transmitted on the $N^{th}$ data line.

3. The display panel according to claim 2, wherein when the scan signals transmitted on the $M^{th}$ scan line are in a pre-charged period, at least part of the data signals are in a first state, and during a time interval after the pre-charged period is over and before the scan signal transmitted on the $M^{th}$ scan line enters a turn-on period, the data signal in the first state in the pre-charged period is switched to a second state, and voltage polarities of the first state and the second state are opposite.

4. The display panel according to claim 1, wherein the first sub-pixels and the second sub-pixels of the pixels in the $N^{th}$ column along the second direction respectively receive the data signals transmitted on an $(N-1)^{th}$ and the $N^{th}$ data line.

5. The display panel according to claim 4, wherein voltage polarities of the data signals transmitted on neighbouring data lines are opposite, and each time the display panel switches frames, each data signal switches voltage polarity thereof.

6. The display panel according to claim 1, wherein each of the first sub-pixels of the pixels in the $N^{th}$ column along the second direction comprises:

a first transistor comprising a source coupled to one of the $N^{th}$ and the $(N-1)^{th}$ data lines, and a gate coupled to the scan line;

a first liquid crystal capacitor for grounding a drain of the first transistor; and a first storage capacitor for coupling the drain of the first transistor to a common voltage line to receive a common voltage.

7. The display panel according to claim 1, wherein each of the second sub-pixels of the pixels in the $M^{th}$ row along the first direction comprises:

a second transistor comprising a gate coupled to the scan line, and a source coupled to the first sub-pixels of the pixels in an $M+1^{th}$ row along the first direction;

a second liquid crystal capacitor for grounding a drain of the second transistor; and a second storage capacitor for coupling the drain of the second transistor to a common voltage line to receive a common voltage.

8. The display panel according to claim 1, further comprising:

a first redundant pixel group comprising a plurality of first redundant pixels, wherein each of the first redundant pixel is correspondingly coupled to the pixels in the first row along the first direction respectively; and a second redundant pixel group comprising a plurality of second redundant pixels, wherein each of the second redundant pixels is correspondingly coupled to the pixels in the last row along the first direction respectively.

9. The display panel according to claim 1, wherein the first direction and the second direction are perpendicular to each other.

10. A method for driving a plurality of pixels in a display panel, wherein the pixels are arranged in an array, and each pixel comprises a first sub-pixel and a second sub-pixel, the driving method comprising:

controlling polarities of driving voltages of the first sub-pixel and the second sub-pixel to be opposite;

generating a scan signal to enable pixels in an $M^{th}$ row along a first direction, wherein M is a positive integer;

generating a data signal to drive pixels in an $N^{th}$ column along a second direction, wherein N is a positive integer;

making the data signal to be in a first state when the scan signal is in a pre-charged period; and making the data signal to be in a second state during a time interval after the pre-charged period is over and before the scan signal enters a turn-on period, wherein voltage polarities of the first state and the second state are opposite, such that driving voltages of the first sub-pixel and the second sub-pixel of the each pixel are opposite.

11. A method for driving a plurality of pixels in a display panel, wherein the pixels are arranged in an array, and each pixel comprises a first sub-pixel and a second sub-pixel, the driving method comprising:

controlling polarities of driving voltages of the first sub-pixel and the second sub-pixel to be opposite;

generating a scan signal to enable the pixels in an $M^{th}$ row along a first direction, wherein M is a positive integer;

generating a first data signal to drive a part of the first sub-pixels and the second sub-pixels in an $N^{th}$ column along a second direction, wherein N is a positive integer;

generating a second data signal to drive remaining first sub-pixels and second sub-pixels in the $N^{th}$ column along the second direction, wherein the voltage polarities of the first data signal and the second data signal are opposite, such that the driving voltages of the first sub-pixel and the second sub-pixel of the each pixel are opposite; and switching the polarities of the first data signal and the second data signal in sync when frames are switched.

* * * * *